United States Patent [19]

Okafuji et al.

[11] Patent Number: 5,289,633
[45] Date of Patent: Mar. 1, 1994

[54] PROCESS OF MANUFACTURING AN ELECTRICAL INTERCONNECTION ASSEMBLY

[75] Inventors: Osamu Okafuji; Akiyoshi Sato; Yamaguchi, Akio, all of Shizuoka, Japan

[73] Assignee: Yazaki Corporation, Tokyo, Japan

[21] Appl. No.: 921,772

[22] Filed: Jul. 30, 1992

Related U.S. Application Data

[62] Division of Ser. No. 786,658, Nov. 1, 1991, Pat. No. 5,156,557.

[30] Foreign Application Priority Data

Nov. 6, 1990 [JP] Japan ............................ 2-299068
Nov. 6, 1990 [JP] Japan ............................ 2-299069
Jan. 21, 1991 [JP] Japan ............................ 3-5337

[51] Int. Cl.⁵ .................... H05K 3/10; H05K 13/06
[52] U.S. Cl. ........................ 29/850; 29/566.2; 29/760
[58] Field of Search .............. 29/33 F, 33 M, 34 D, 29/433, 566, 566.1, 566.2, 759, 760, 846, 850; 439/45, 46, 47, 48, 74, 75; 254/134.3

[56] References Cited

U.S. PATENT DOCUMENTS

| | | | |
|---|---|---|---|
| 3,279,040 | 10/1966 | Propster, Jr. | 29/850 X |
| 4,387,509 | 6/1983 | Dechelette | 29/850 |
| 4,461,061 | 7/1984 | Rock | 29/566.2 X |
| 4,627,162 | 12/1986 | Holt | 29/850 X |
| 4,684,765 | 8/1987 | Beck et al. | 29/850 X |
| 4,934,044 | 6/1990 | Hasegawa et al. | 29/850 |
| 5,017,145 | 5/1991 | Kanai et al. | 439/45 |

FOREIGN PATENT DOCUMENTS

| | | | |
|---|---|---|---|
| 104874 | 4/1984 | European Pat. Off. | |
| 182528 | 5/1986 | European Pat. Off. | |
| 278830 | 11/1990 | Japan | 29/850 |
| 306597 | 7/1971 | U.S.S.R. | 29/850 |
| 1185587 | 3/1970 | United Kingdom | |
| 1452445 | 10/1976 | United Kingdom | 29/850 |

OTHER PUBLICATIONS

"Wire Print Head For Resistance Ribbon" IBM Technical Disclosure Bulletin, Vol. 21 No. 1, Jun. 1978.

Primary Examiner—Peter D. Vo
Attorney, Agent, or Firm—Nikaido, Marmelstein Murray & Oram

[57] ABSTRACT

An electrical interconnection assembly which prevents a slack of insulated wire pieces interconnecting wire receiving terminals and is high in reliability in electric connection between them and suitable for high density wiring. The assembly comprises an insulating support body, a plurality of wire receiving terminals mounted on the insulating support body and each having a wire receiving slot formed at an end portion thereof, each of the wire receiving terminals having a terminal portion at the other end thereof, an insulated wire selectively received in the slots of the wire receiving terminals and cut into a plurality of wire pieces in such a manner as to form a predetermined wiring pattern, and a plurality of wire holding bosses provided on the insulating support body for holding intermediate portions of the wire pieces extending between the wire receiving terminals to retain the insulated wire in the predetermined wiring pattern. Also a process of and an apparatus for manufacturing such electrical interconnection assembly and a wire laying jig for use with such process and apparatus are disclosed.

7 Claims, 12 Drawing Sheets

PROCESS OF MANUFACTURING AN ELECTRICAL INTERCONNECTION ASSEMBLY

This is a division of application Ser. No. 786,658 filed Nov. 1, 1991, U.S. Pat. No. 5,156,557.

BACKGROUND OF THE INVENTION

1. Field of the Invention

This invention relates to an electrical interconnection assembly wherein a plurality of pressure contacting terminals mounted on an insulating support body are interconnected by pieces of an insulated wire in such a manner as to form a predetermined pattern and also to a process of and an apparatus for manufacturing such electrical-interconnection assembly as well as a wire laying jig which is used with such manufacturing process and apparatus.

2. Description of the Prior Art

An electrical interconnection assembly wherein a layered bus bar wiring plate which includes a plurality of bus bars and an insulating support disposed in an overlapping relationship with each other is built in an insulating casing and electric parts such as fuses and relays are mounted on the layered bus bar wiring plate is conventionally employed widely for the electric wiring of an automobile for the object of absorption of a joint included in the wire harness or for the protection of a circuit.

However, circuit construction is complicated where the electrical interconnection only includes bus bars, and a change of designing of an entire bus bar circuit cannot be avoided in partial modification of a circuit for different types or grades of automobiles.

Thus, an electrical interconnection assembly has been proposed and is disclosed in U.S. Pat. No. 4,387,509 wherein a plurality of terminals (wire receiving terminals) are mounted on an insulating support body and are interconnected by way of insulated wire pieces. Such electrical interconnection assembly is shown in FIGS. 12 and 13. Referring to FIGS. 12 and 13, the electrical interconnection assembly generally denoted at 105 includes an insulating support body 100 in the form of a plate, and a plurality of wire receiving terminals 101. Each of the wire receiving terminals 101 has, at an end portion thereof, a slotted plate portion 102 having a slot 103 formed therein to receive an insulated wire to establish an electrical connection to the insulated wire and projecting from an upper face of the insulating support body 100, and further has, at the other end thereof, a terminal portion 104 formed integrally with the slotted plate portion 102 and projecting downwardly from the other lower face of the insulating support body 100. The wire receiving terminals 101 are mounted on the insulating support body 100 in any conventional known manner. The electrical interconnection assembly 105 shown in FIG. 13 is thus constructed such that the wire receiving terminals 101 are interconnected by a plurality of insulated wire pieces 106 in such a manner as to form a predetermined pattern.

The electrical interconnection assembly 105 is manufactured in the following manner. Referring to FIG. 14, first, an insulated wire 106 is laid into a groove 108 cut in a template 107, and then, the insulated wire 106 is cut into a plurality of pieces in the groove 108 by means of a carrier plate 109 on which a plurality cutting pins 110 are carried. Then, the wire pieces 106 are ejected from the groove 108 toward the insulating support body 100 and forced into the slots 103 of the wire receiving terminals 101 using an ejecting plate 111 which has a plurality ejecting pins 112 thereon. Consequently, such a product as shown in FIG. 13 is obtained.

In the electrical interconnection assembly 105 of the structure shown in FIG. 13, although the insulated wire pieces 106 are forced fitted into and thereafter retained in the slots 203 of the wire receiving terminals 101, intermediate portions of the wire pieces 106 are not supported at all, and accordingly, there is the possibility that a wire piece may be slackened or may be removed from a terminal. accordingly, high density wiring is difficult.

While the template 107 having the groove 108 cut therein is used at a pretreatment step precedent to another step at which the wire 106 is laid along a predetermined route onto the insulating support body 100, the groove 108 allows wire laying only in a particular fixed pattern, and in order to cope with various types or grades of automobiles or various parts, a large number of templates must be prepared.

Further, when such a plurality of insulated wire pieces 106 are to be transferred from the template 107 to the insulating support body 100, since the ejecting pins 112 do not always correspond to an arrangement pattern of such wire pieces, it is difficult to assure a high quality of electric contact due to a possible slack of a wire piece described above. Further, since the wire 106 is cut before it is received by the terminals 101, the wire pieces 106 are in a hashed condition when they are transferred from the template 107 to the insulating support body 100, and may move or be displaced in the groove 108 and the wire receiving positions of the terminals 101 likely become uncertain.

SUMMARY OF THE INVENTION

It is an object of the present invention to provide an electrical interconnection assembly which prevents a slack of insulated wire pieces interconnecting wire receiving terminals and is high in reliability in electric connection between them and suitable for high density wiring.

It is another object of the present invention to provide an electrical interconnection assembly wherein a wiring pattern can be changed readily.

It is a further object of the present invention to provide a process of and an apparatus for manufacturing an electrical interconnection assembly which is high in reliability in electrical connection and suitable for high density wiring and is easy to change a wiring pattern.

It is a still further object of the present invention to provide a wire laying jig which can cope readily with changing of a circuit pattern to be formed on an electrical interconnection assembly and is superior in economy and with regard to management.

In order to attain the objects, according to one aspect of the present invention, there is provided an electrical interconnection assembly, which comprises an insulating support body, a plurality of wire receiving terminals mounted on the insulating support body and each having a wire receiving slot formed at an end portion thereof, each of the wire receiving terminals having a terminal portion at the other end thereof, an insulated wire selectively received in the slots of the wire receiving terminals and cut into a plurality of wire pieces in such a manner as to form a predetermined wiring pattern, and a plurality of wire holding bosses provided on the insulating support body for holding intermediate portions of the wire pieces extending between the wire receiving terminals to retain the insulated wire in the predetermined wiring pattern.

With the electrical interconnection assembly, since the insulated wire pieces for interconnecting the wire receiving terminals are held between the wire holding bosses of the insulating support body, there is no possibility that a slack or displacement of a wire piece may take place, and the electrical interconnection assembly is high in reliability in electrical interconnection.

Further, by changing the arrangement routes of the insulating wire making use of the wire holding bosses, a desired wiring pattern can be formed coping with a type or a grade of an automobile and high density wiring is possible by a shape maintaining function of the wire holding bosses.

According to another aspect of the present invention, there is provided a process of manufacturing an electrical interconnection assembly wherein a plurality of wire receiving terminals are mounted on an insulating support body and interconnected in a predetermined wiring pattern by an insulated wire, which process comprises at least the steps of arranging a continuous length of insulated electrical wire onto a wire laying pallet which has a plurality of wire laying pins mounted in a plurality of rows thereon for movement to and from a projecting position in which the wire laying pins project from the wire laying pallet, the wire laying pallet further having a plurality of wire forcing ribs along the rows of the wire laying pins, and placing onto the wire laying pins of the wire laying pallet an insulating support body on which a plurality of wire receiving terminals each having at an end thereof a wire receiving plate portion having a slot formed therein and each having a terminal portion at the other end thereof are mounted and which has a plurality of wire holding bosses provided thereon to push down the wire laying pins to move from the projecting position thereby to urge the insulated wire to be released from the wire laying pins and inserted between the wire holding bosses to transfer the insulated wire to the insulating support body. The process may further comprise the steps of force fitting the insulated wire transferred to the insulating support body into the slots of the wire receiving terminals to establish electric connection between the core of the wire and the terminals, and cutting the wire at predetermined portions into a plurality of pieces to form a predetermined wiring pattern.

According to a further aspect of the present invention, there is provided an apparatus for manufacturing an electrical interconnection assembly, which comprises a wire laying unit including a wire laying pallet which has a plurality of pin holes formed therein and has a plurality of wire forcing ribs provided thereon, a mounting base plate on and above which the wire laying pallet is secured in a suitably spaced relationship, a pin board having a plurality of wire laying pins mounted thereon for movement to and from a projecting position in which the wire laying pins project from the wire laying pallet into the pin holes of the wire laying pallet, the pin board being mounted for up and down movement between the wire laying pallet and the mounting base plate, coil spring means interposed between the mounting base plate and the pin board for normally biasing the pin board upwardly, a wire laying head having at a lower end portion thereof a rockable wire laying jig including a wire extracting nozzle, the wire laying head being mounted for up and down movement relative to the wire laying pallet, and means for moving one of the mounting base plate and the wire laying head in two horizontal perpendicular directions relative to the other, and a wire transferring unit including means for gripping an insulating support body, on which a plurality of wire receiving terminals are mounted and which has a plurality of wire holding bosses provided thereon, for upward and downward movement in an opposing relationship to the wire laying pallet, the wire transferring unit being operable to place the insulating support body onto the wire laying pins of the wire laying pallet and push down the wire laying pins thereby to urge the insulated wire to be released from the wire laying pins and inserted between the wire holding bosses to transfer the insulated wire to the insulating support body.

According to a still further aspect of the present invention, there is provided an apparatus for manufacturing an electrical interconnection assembly, which comprises a wire laying unit for laying an insulated wire along a predetermined route onto a wire laying jig which has a plurality of wire laying pins mounted thereon for movement to and from a projecting position in which the wire laying pins project from the wire laying jig, the wire laying jig further having a plurality of wire forcing ribs provided thereon, a wire transferring unit for pushing down the wire laying pins from the projecting position to transfer the insulated wire from the wire laying jig to an insulating support body on which a plurality of wire receiving terminals each having at an end thereof a wire receiving plate portion having a slot formed therein and each having a terminal portion at the other end thereof are mounted and which has a plurality of wire holding bosses provided thereon, an urging unit including means for force fitting the insulated wire thus transferred to the insulating support body into the slots of the wire receiving terminals to establish electric connection between the core of the wire and the terminals, and a wire cutting unit including means for cutting the insulated wire connected to the wire receiving terminals at predetermined portions into a plurality of pieces to form a predetermined wiring pattern.

With the manufacturing process and apparatus, since a wire arranged once along the wire laying pins on the wire laying jig or pallet is transferred to an insulating support body, an arbitrary pattern can be formed, for example, coping with a type or a grade of an automobile, and a modification to a wiring pattern is easy. The manufacturing process and apparatus are thus suitable also for manufacture of various types by small quantities.

Since the insulated wire transferred to the insulating support body is maintained in wiring pattern as it is by the wire holding bosses, also high density wiring is possible. Further, since a slack or displacement does not take place with the insulated wire piece, there is no possibility that the wire may be removed from a slot of a wire receiving terminal, and an electrical interconnection assembly having a high reliability with pressure contacting portions can be manufactured.

According to a yet further aspect of the present invention, there is provided a wire laying jig which comprises a pin board having a plurality of wire laying pins provided uprightly thereon, and a wire laying pallet having a plurality of pin holes formed therein such that the wire laying pins are fitted for sliding movement in the pin holes to transfer an insulated wire arranged on the wire laying pins to a wiring plate body, the pin board having a plurality of rotatable plates disposed thereon, the pin board further having a plurality of rotatable elements disposed thereon for rotation at eccentric positions of the rotatable plates, the wire laying pins being provided on the rotatable elements such that they can be positioned at the centers of rotation of the rotatable plates.

With the wire laying jig, the rotatable plates and the rotatable elements can be rotated suitably so that the wire laying pins may be set to desired positions to attain a desired wiring pattern. Accordingly, it is possible to cope with various circuit patterns and hence a variation of a pattern being employed, and the production cost is low and besides the required storage spacing is small.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
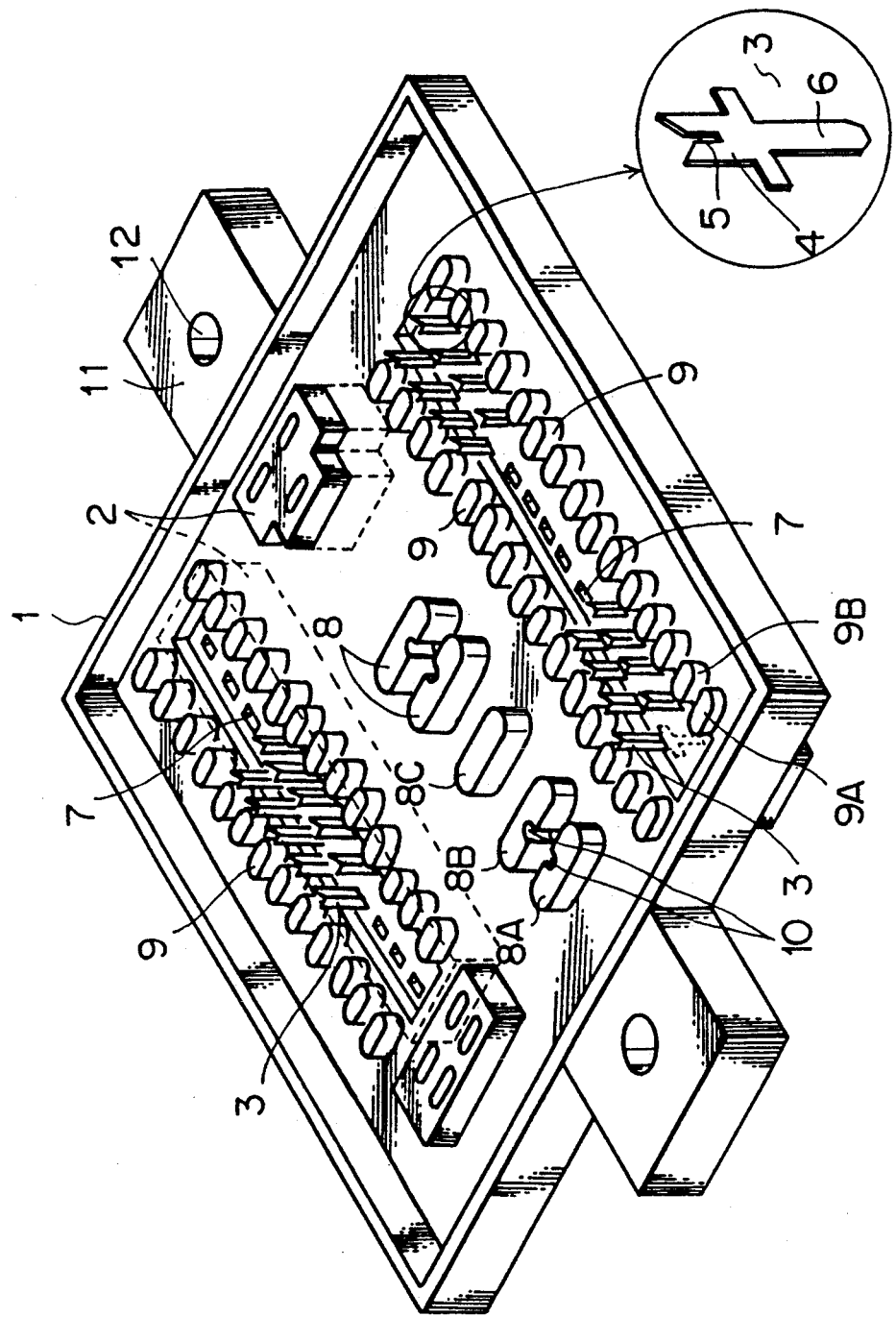
FIG. 1 is a perspective view of an insulating support body for use with an electrical interconnection assembly according to the present invention.

Referring first to FIG. 1, there is shown an insulating support body for use with an electrical interconnection assembly according to the present invention. The insulating support body is generally denoted at 1 and is formed as an upper casing of an insulating casing not shown which constitutes an outer shell of an electrical connection box not shown.

The insulating support body 1 has a plurality of housings 2 mounted thereon for connecting various electric parts such as connectors thereto, and has a plurality of wire receiving terminals 3 mounted on an inner face thereof in pairs of rows in an opposing relationship to the housings 2. Each of the wire receiving terminals 3 has, at an end portion thereof, a slotted wire receiving plate portion 4 having a slot 5 formed therein and has, at the other end thereof, a terminal portion 6 integral with the wire receiving plate portion 4. The wire receiving terminals 3 are received at the terminal portions 6 in holes 7 formed in the insulating support body 1 and project into the housings 2.

A plurality of large and small wire holding bosses 8 and 9 are provided on the inner face of the insulating support body 1 for holding thereon a wire in a laying pattern which will be hereinafter described. The large size bosses 8 are disposed at central locations of the insulating support body 1 while the small size bosses 9 are disposed at positions on the opposite front and rear sides of the rows of the wire receiving terminals 3. Most of the wire holding bosses 8 and 9 are disposed in pair as indicated by reference characters 8A and 8B or 9A and 9B. but some of them are disposed singly as indicated by reference character 8C for the convenience of wire laying. The opposing large size bosses 8A and 8B have provided thereon opposing relief grooves 10 for wire receiving terminals not shown of a lower casing not shown which is opposed to the upper casing. While the wire holding bosses 8 and 9 have such an elliptical column-like profile as seen in FIG. 1 they are not limited to those of such specific profile but may have an arbitrary profile such as a circular column-like profile, a prism-shaped column-like profile or may be formed as a continuous wall wherein such a plurality of slots for holding wires as the slots 5 are formed in a wall member.

It is to be noted that, while a pair of fixing tabs 11 each having a bolt hole 12 formed therein are provided on the opposite sides of the insulating support body 1, when the fixing plates 1 are placed on a platform at various processing steps which will be hereinafter described, they can be positioned by means of the bolt holes 12.

Figure 2:
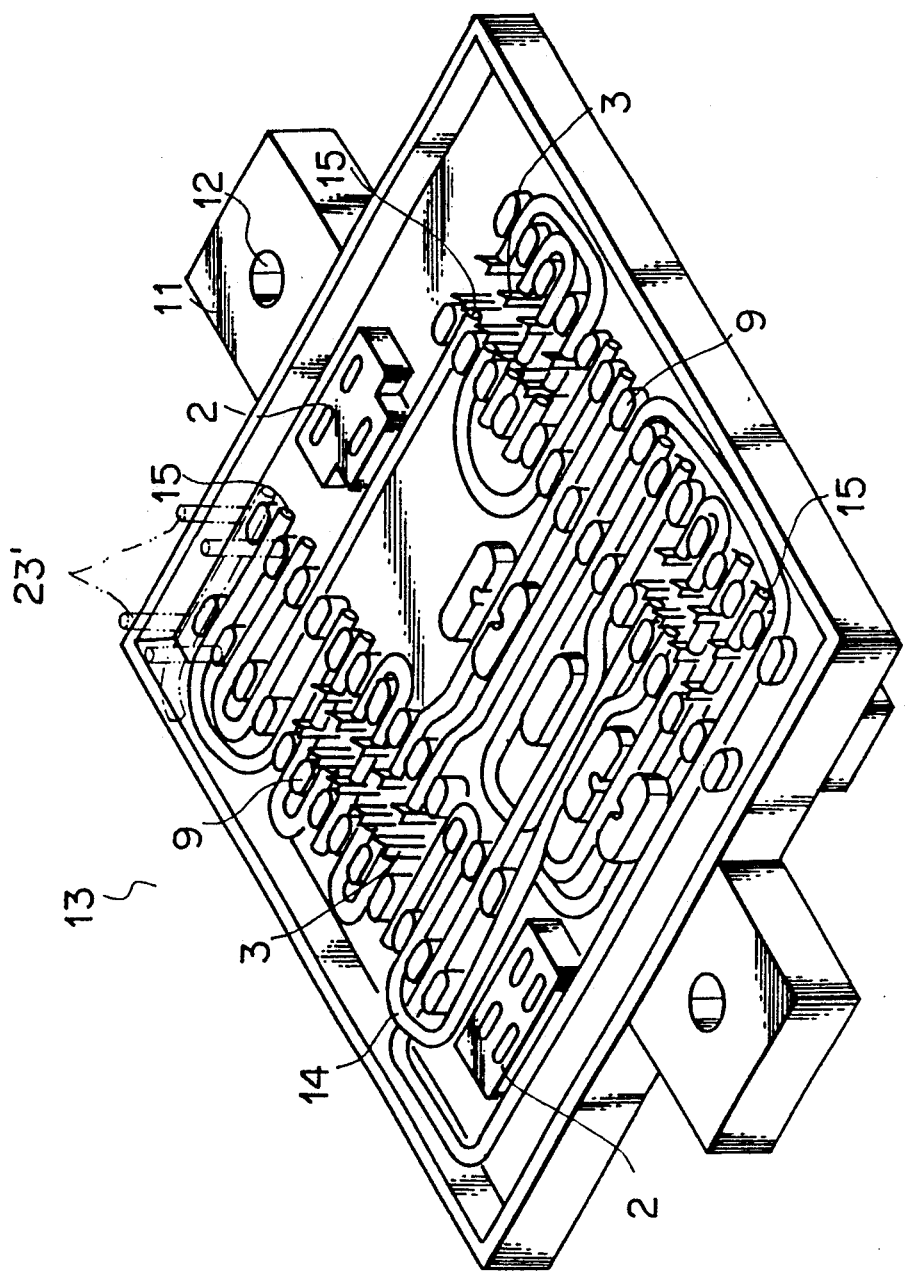
FIG. 2 is a perspective view of an electrical interconnection assembly to which the present invention is applied.

Referring now to FIG. 2, there is shown an electrical interconnection assembly to which the present invention is applied. The electrical interconnection assembly is generally denoted at 13 and employs such insulating support body I as shown in FIG. 1 and described above. The electrical interconnection assembly 13 further includes a single insulated wire (or several insulated wires) 14 which is disposed in accordance with a predetermined route between the wire holding bosses 8 and between the wire holding bosses 9 of the insulating support body 1 and is force fitted in the slots 5 of the wire receiving terminals 3 to electrically connect the conductor of the insulated wire 14 to the wire receiving terminals 3. The insulated wire 14 is cut at such portions as denoted at 15 into a plurality of wire pieces, and the wire receiving terminals 3 are interconnected by way of the wire pieces 14 in such a manner as to form a predetermined pattern. It is to be noted that a plurality of such wires 14 may be overlapped between the wire holding bosses 8 or 9 or may be disposed in a crossing condition outside the bosses 8 and 9.

Figure 3:
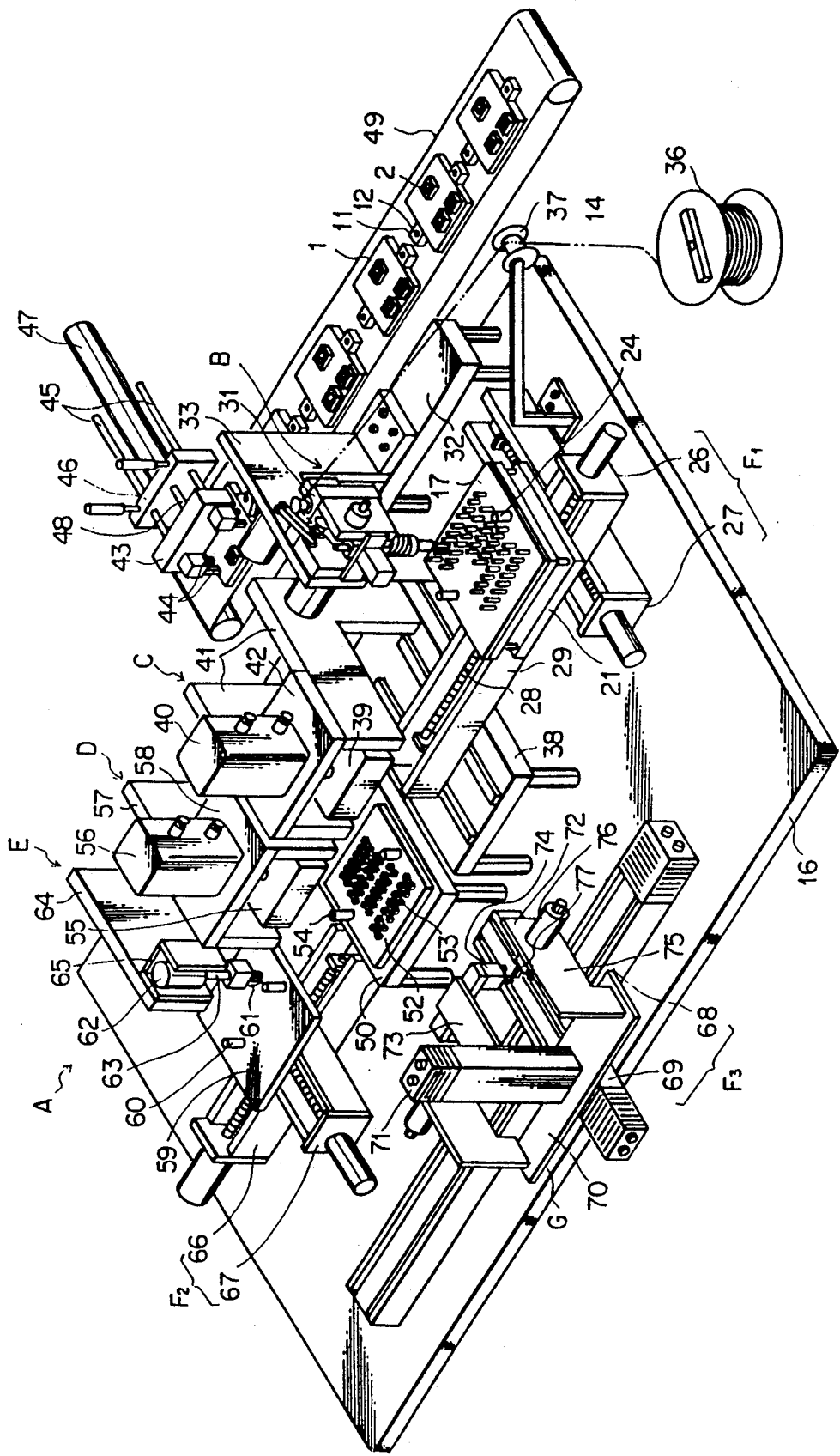
FIG. 3 is a schematic perspective view showing an apparatus for manufacturing the electrical interconnection assembly of FIG. 2.

Referring now to FIG. 3, there is shown an apparatus for manufacturing such electrical interconnection assembly 13 as described above. The manufacturing apparatus shown is generally denoted at A and includes a wire laying unit B, a wire transferring unit C, an urging unit D and a cutting unit E disposed in a concentrated condition on a platform 16.

Wire Laying Unit B

The wire laying unit B performs pretreatment prior to a step at which a wire 14 is arranged in accordance with a predetermined route onto an insulating support body 1. The wire laying unit B includes a wire laying pallet 17, a pin board 22, a wire laying head 31 and a first X-Y feeding mechanism F1.

Figure 4:
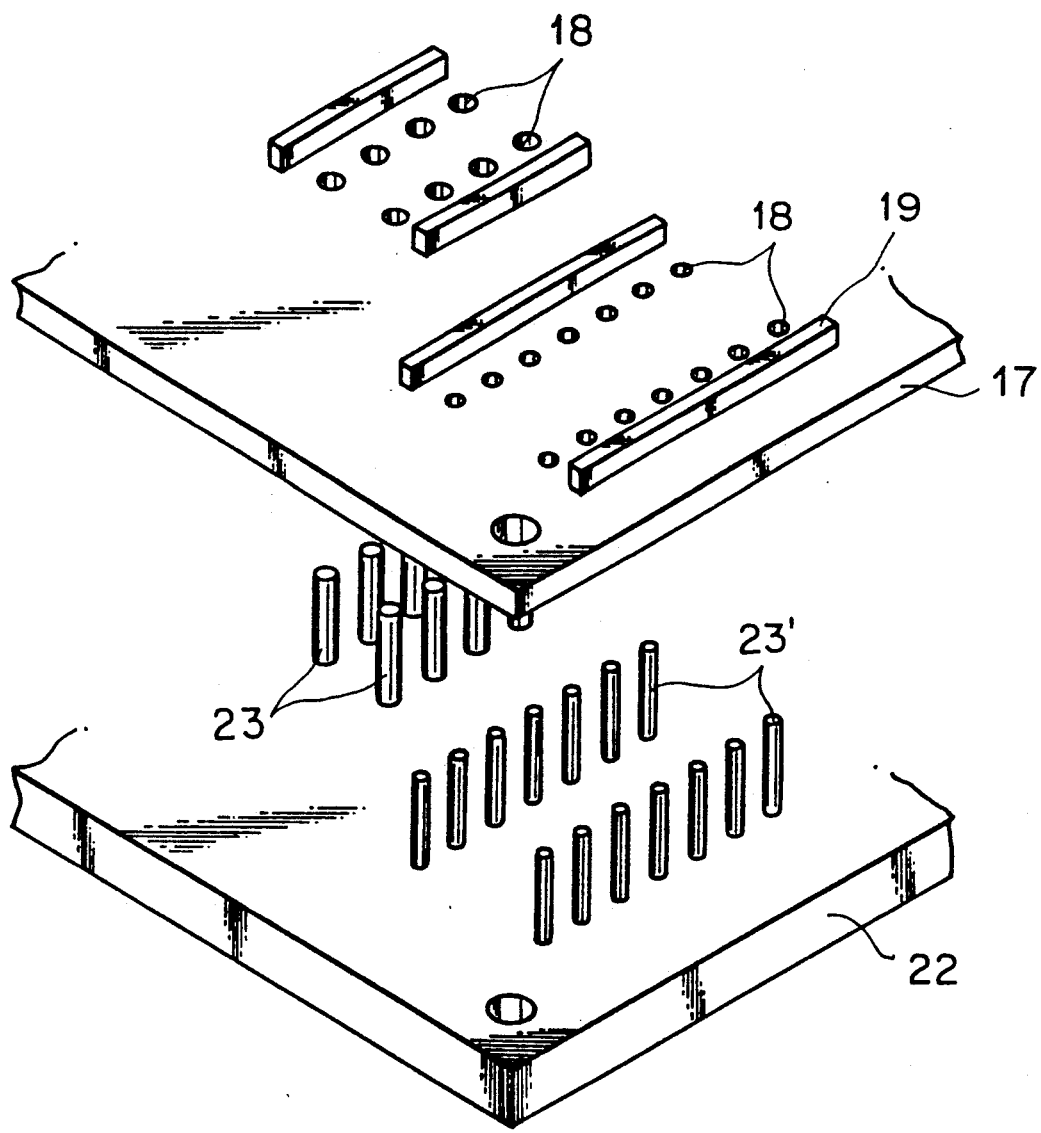
FIG. 4 is a partial fragmentary perspective view showing a wiring pallet and a pin board used to manufacture the electrical interconnection assembly of FIG. 2.
Figure 5:
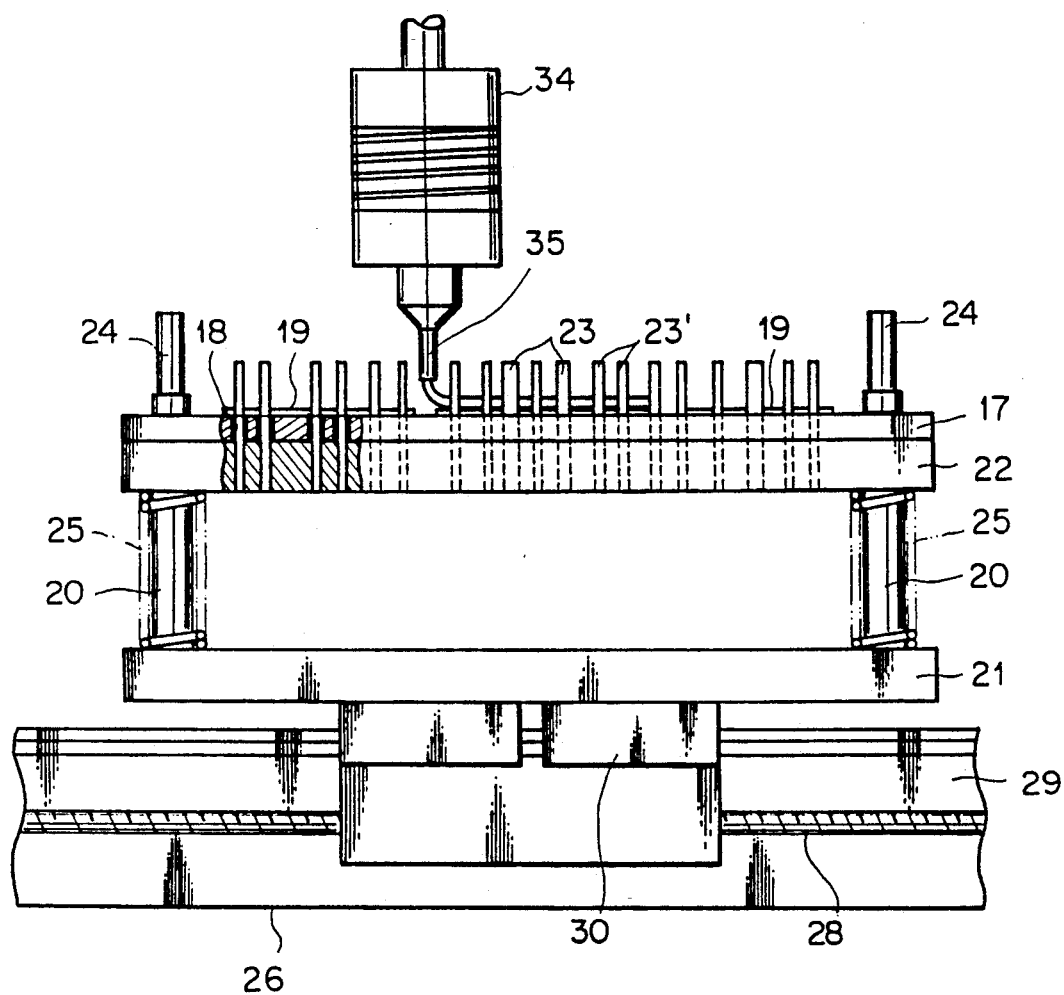
FIG. 5 is an enlarged front elevational view, partly in section, of a wire laying unit of the apparatus of FIG. 3.

Referring also to FIGS. 4 and 5, the wire laying pallet 17 is in the form of a plate of a metal or plastics material and has a plurality of pairs of rows of pin holes 18 formed therein. The wire laying pallet 17 further has a plurality of wire forcing ribs 19 mounted thereon in parallel to the rows of pin holes 18 and is fixed in a suitably spaced relationship on and above a mounting base plate 21 by means of four leg posts 20. The wire forcing ribs 19 are provided in a continuous or intermittent condition in the direction along the rows of pin holes 18 such that they may be positioned between the opposing wire receiving terminals 3 of the insulating support body 1 or between the opposing wire holding bosses 8 or 9 or on the outer sides of the bosses 9 shown in FIG. 1.

The pin board 22 has a pair of positioning pins 24 and a large number of large diameter wire laying pins 23 and small diameter wire laying pins 23' mounted thereon and is mounted for upward and downward movement on the leg posts 20 between the wire laying pallet 17 and the mounting base plate 21. The pin board 22 is normally biased upwardly by compression coil springs 25 fitted around the leg posts 20 so that the pin board 22 normally assumes such a position as shown in FIG. 5 wherein the wire laying pins 23 and 23' extend through the pin holes 18 of the wire laying pallet 17 and projects upwardly from the wire laying pallet 17 and the wire laying pallet 17 is supported on the pin board 22. It is to be noted that the corners of the wire holding bosses 8 and 9 in FIG. 1 are provided such that axial lines thereof coincide with the wire laying pins 23 and 23', respectively (refer to FIG. 2).

Figure 6:
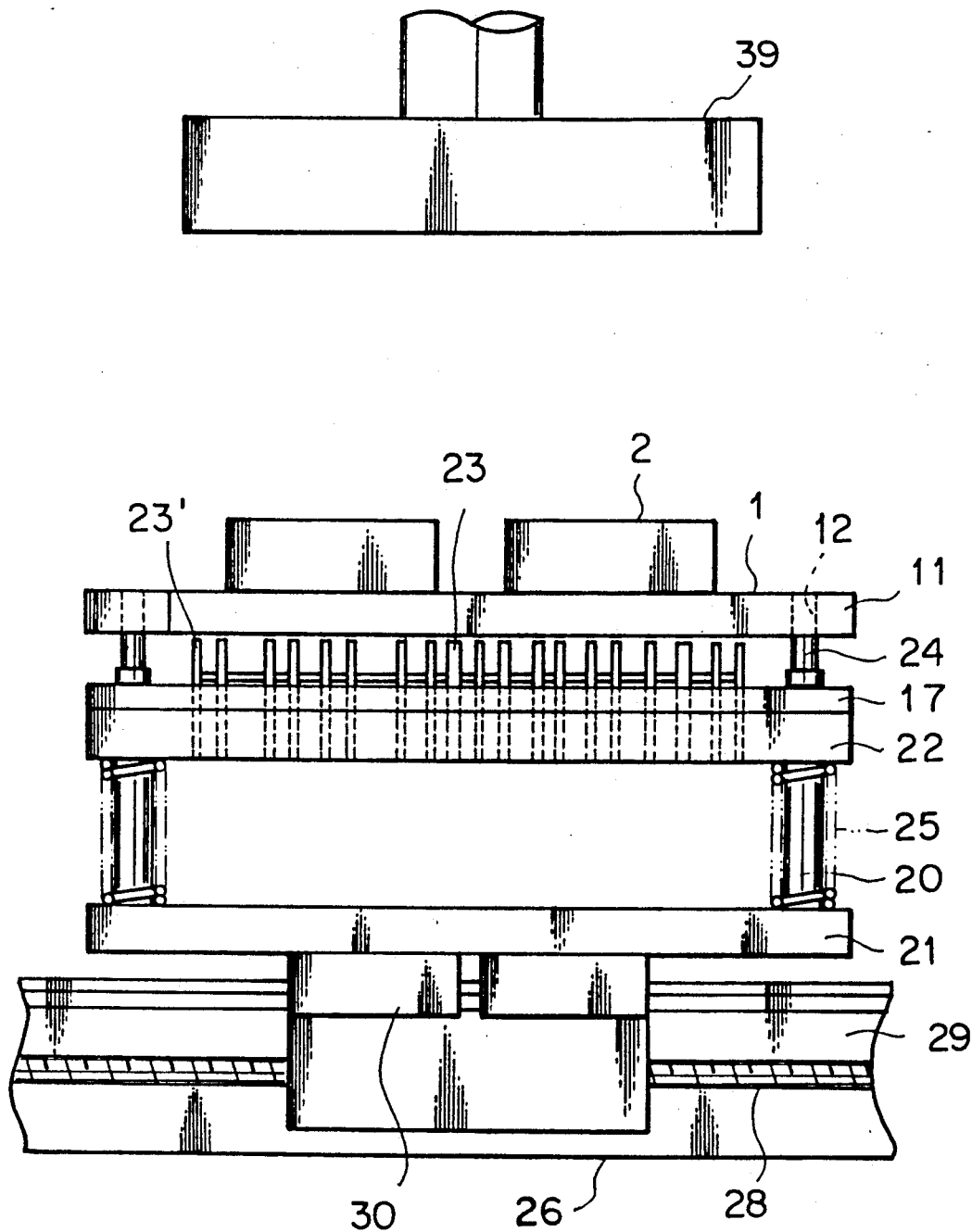
FIG. 6 is an enlarged front elevational view of a wire transferring unit of the apparatus of FIG. 3.

Referring to FIGS. 3, 5 and 6, the wire laying pallet 17 and the mounting base plate 21 for the pin board 22 are supported for movement on an X shaft 26, which is in turn supported for movement on a Y shaft 27 secured to the platform 16. Each of the X and Y shafts 26 and 27 includes a casing 29 and a screw rod 28 which is rotated by a controllable rotating motor not shown, and the mounting base plate 21 is secured to a driven plate 30 which is screwed on the screw rod 28 and mounted for sliding movement on a pair of side walls of the casing 29. Accordingly, the wire laying pallet 17 is moved in the X and Y directions relative to the wire laying head 31 by the first X-Y feeding mechanism F1 including the X shaft 26 and the Y shaft 27.

The wire laying head 31 is provided to lay a wire 14 onto the wire laying pallet 17 and is mounted for upward and downward movement on a stand 33 on a stand mounting base 32 in an opposing relationship to the wire laying pallet 17. The wire laying head 31 includes a rockable wire laying jig 34 (refer to FIG. 5) having a wire extracting nozzle 35 at a lower end thereof. Such wire 14 is extracted from a wire reel 36 and connects to the jig 34 by way of a roll 37.

Wire Transferring Unit C

Referring to FIGS. 3 and 6, the wire transferring unit C is provided to transfer a wire 14 laid on the wire laying pallet 17 to an insulating support body 1. The wire transferring unit C includes a transferring base 38 and a press ram 39 together with the wire laying pallet 17 and the pin board 22.

The X shaft 26 of the first X-Y feeding mechanism F1 extends to the transferring base 38, and the press ram 39 for pressing an insulating support body 1 is provided above the transferring base 38. The press ram 39 is moved upwardly and downwardly by an actuator 40 of a known construction which is operated by a hydraulic pressure or a pneumatic pressure. The actuator 40 is secured to a support 42 installed on a pair of stands 41.

A supplying hand 43 for supplying an insulating support body 1 is mounted for advancing and retreating movement behind the stands 41. The supplying hind 43 has a pair of gripping elements 44 on the opposite sides of a lower face thereof and has two parallel guide bars 45 provided on a rear face thereof. The guide bars 45 extend rearwardly through holes of a mounting plate 46 of an actuator 47, and a piston rod 48 of the actuator 47 extends forwardly through the mounting plate 46 and is secured to a rear face of the supplying hand 43.

The supplying hand 43 is provided for upward and downward movement with the mounting plate 46 thereof mounted on a stand not shown. Reference numeral 49 denotes a conveyor for transporting an insulating support body 1.

Urging Unit D

Figure 7:
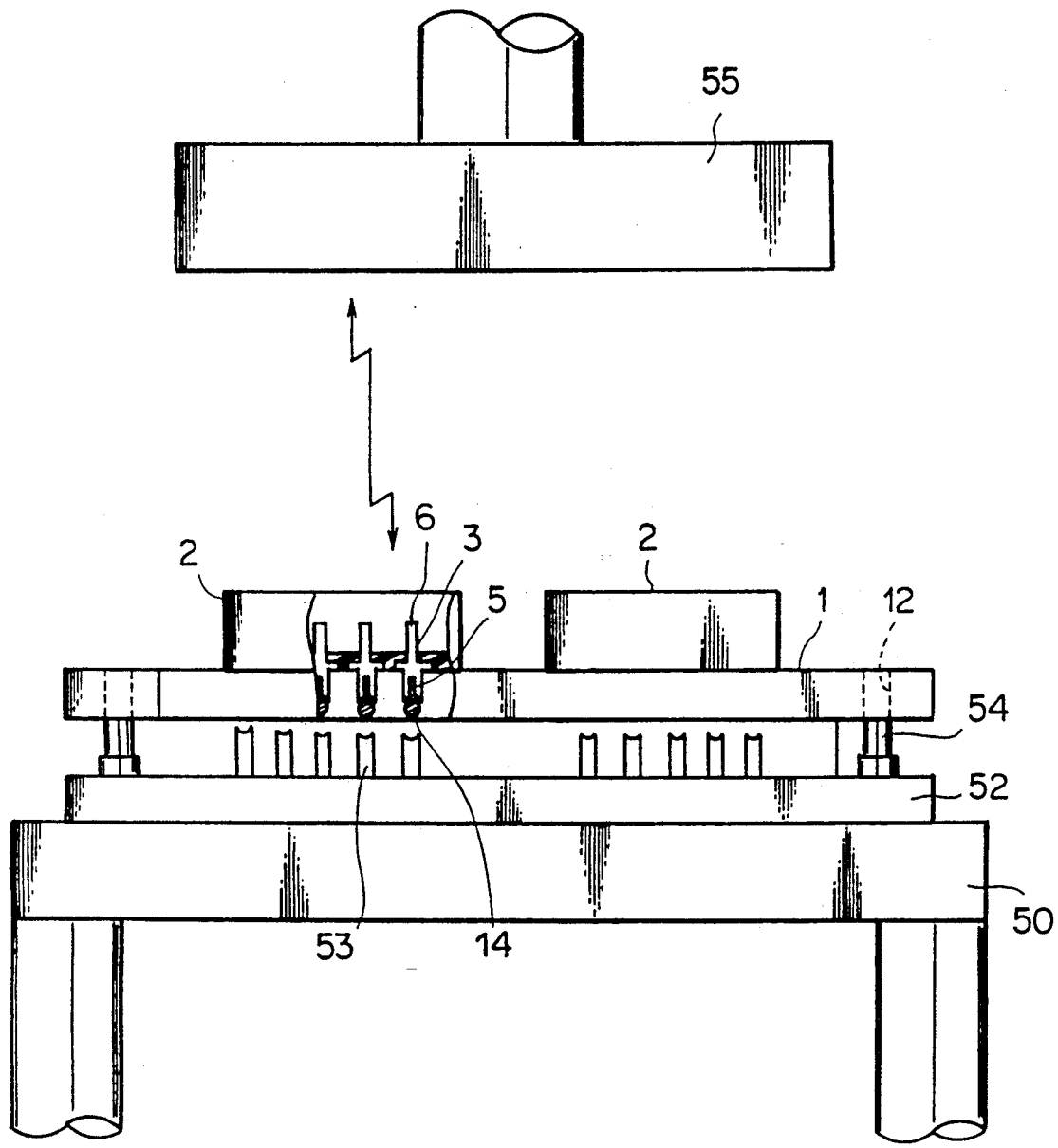
FIG. 7 is an enlarged front elevational view, partly in section, of an urging unit of the apparatus of FIG. 3.

Referring to FIG. 7, the urging unit D is provided to urge a wire 14 transferred from the wire laying pallet 17 to an insulating support body 1 in position to interconnect the wire receiving terminals of the insulating support body 13 by means of the wire 14. The urging unit D includes an urging base 50, an urging jig plate 52 and a press ram 55.

The urging jig plate 52 is secured to the urging base 50. A plurality of urging blades 53 are provided on an upper face of the urging jig plate 52 while a pair of positioning pins 54 are provided uprightly on the opposite end portions of the urging jig plate 52. The urging blades 53 are disposed corresponding to the positions of the wire receiving terminals 3 mounted on an insulating support body 1 shown in FIG. 1 while the positioning pins 54 are provided corresponding to the bolt holes 12 of the insulating support body 1. The press ram 55 is mounted for up and down movement above the urging jig plate 52. An actuator 56 for actuating the press ram 55 is secured to a support 58 mounted on a pair of stands 57 (FIG. 3).

Cutting Unit E

Figure 8:
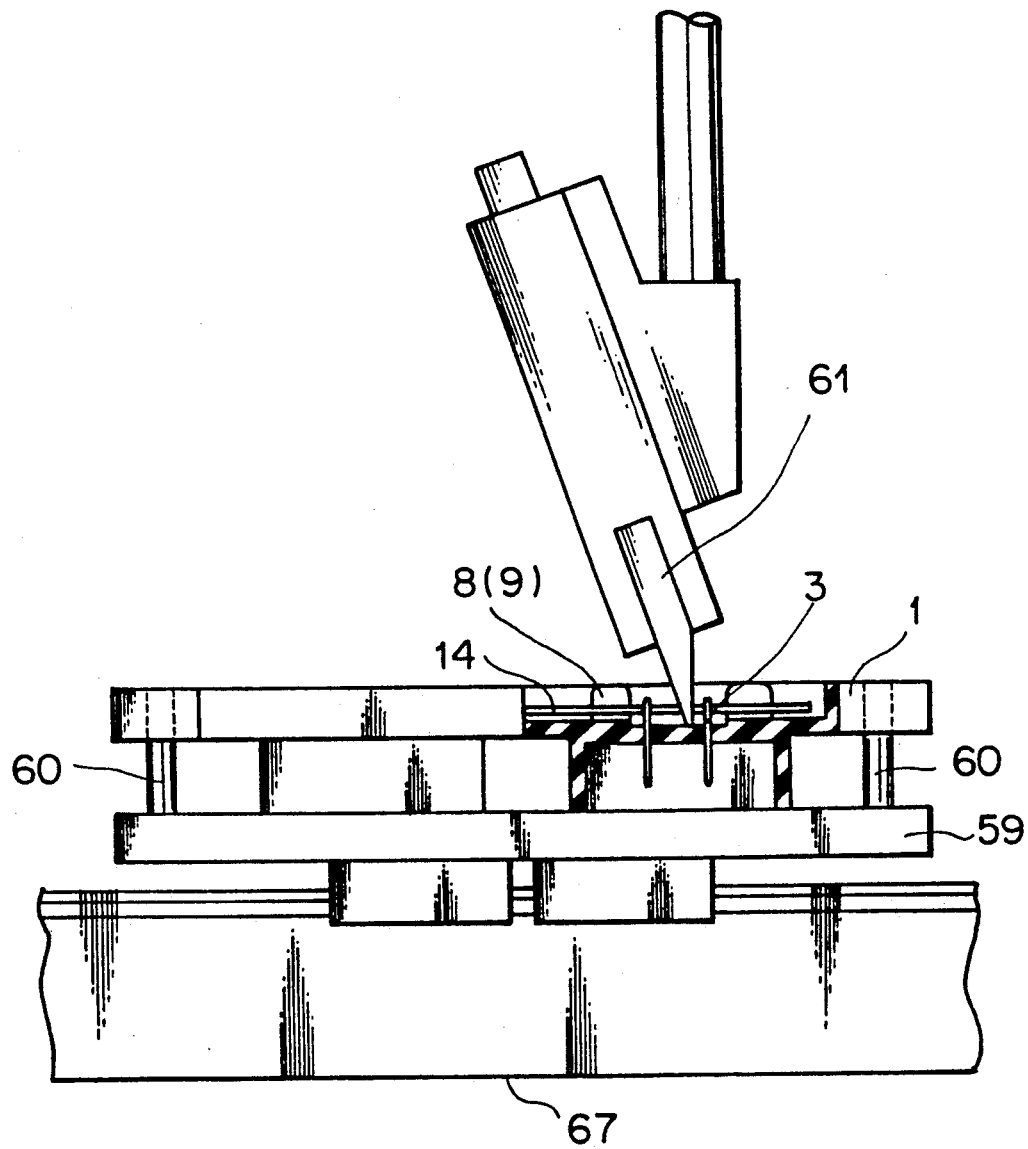
FIG. 8 is an enlarged front elevational view, partly in section, of a cutting unit of the apparatus of FIG. 3.

Referring to FIGS. 3 and 8, the cutting unit E is provided to cut a single wire (or several wires) 14 at required locations received in the wire receiving terminals 3 into a plurality of wire pieces to form a predetermined pattern. The cutting unit E includes a support plate 59 for carrying an insulating support body 1 thereon and a cutting blade or nipper 61.

The support plate 59 has a pair of positioning pins 60 similarly to the urging jig plate 52, and the cutting blade 61 is mounted for up and down movement above the support plate 59. The cutting blade 61 includes a pair of blade elements which are opened or closed by a pneumatic pressure, and is secured to a lower end of a piston rod 63 of an actuator 62, which is secured to a mounting frame 65 mounted on a stand 64 provided uprightly on the platform 16.

The support plate 59 of the cutting unit E can be moved in the X and Y directions relative to the cutting blade 61 by means of a second X-Y feeding mechanism F2 which includes an X shaft 66 and a Y shaft 67 similarly to the wire laying pallet 17.

Referring to FIG. 3, a turning over, transferring and feeding robot G is provided to turn over an insulating support body 1 to which wire pieces 14 have been transferred by the wire transferring unit C and transfer the thus turned over insulating support body 1 to the urging unit D and then to the cutting unit E.

The turning over, transferring and feeding robot G includes a lifting unit 71 and a turning over unit 72 provided on a bottom plate member 70 which is moved by a third X-Y feeding mechanism F3 including an X shaft 68 and a Y shaft 69. The lifting unit 71 includes a pair of gripping elements 74 provided on the opposite sides at an end of an arm 73, and the turning over unit 72 includes a pair of gripping elements 77 provided for rotation on a pair of beam members 75 on the opposite sides of the turning over unit 72 and directly coupled to an actuator 76.

Subsequently, description will be given of operation of the various units B to E described above and manufacture of such an electrical interconnection assemble 13 as described hereinabove.

<Wire Laying Step>

A single wire (or several wires) 14 is first laid as shown in FIG. 5 in accordance with a predetermined route in a so-called single stroke onto a wire laying pallet 17 which is mounted on the pin board 22 such that the plurality of wire laying pins 23 and 23' of the pin board 22 project upwardly through the pin holes 18 of the wire laying pallet 17.

In this instance, the rockable wire laying jig 34 is first moved down toward the wire laying pallet 17, and then an end of the wire 14 projecting from the wire extracting nozzle 35 is fixed to a predetermined location.

Then, the wire laying pallet 17 is fed by the first X-Y feeding mechanism F1 so that the wire 14 may be arranged between the wire laying pins 23 and 23' in accordance with a predetermined route, and then the wire 14 is cut by a cutting blade not shown so that the thus cut wire 14 may be left on the wire laying pallet 17.

Such feeding movement of the wire laying pallet 17 is performed such that the X shaft 26 and the Y shaft 27 are controlled in position in accordance with output signals of a controlling apparatus (not shown) using a control program (NC control). Consequently, the wire 14 is laid in accordance with the predetermined route.

<Wire Transferring Step>

The wire laying pallet 17 after completion of such laying of the wire 14 is transported together with the mounting base plate 21 thereof to the transferring table 38 of the wire transferring unit C and is positioned below the press ram 39.

Then, an insulating support body 1 is placed onto the wire laying pallet 7 such that the pins 24 on the wire laying pallet 7 are fitted into the bolt holes 12 of the insulating support body 1 as shown in FIG. 6.

The insulating support body 1 is automatically supplied by the conveyor 49 and the supplying hand 43 shown in FIG. 3. In particular, the insulating support body 1 is transported by the conveyor 49 with the wire holding bosses 8 and 9 thereof directed downwardly, and at a last end portion of the conveyor 49, the gripping elements 44 of the supplying hand 43 grip, for example, a housing 2 to lift the insulating support body 1. Then, the piston rod 48 of the actuator 47 is advanced to position and set the insulating support body 1 onto the wire laying pallet 17.

Referring back to FIG. 6, the press ram 39 is subsequently moved down while the insulating support body 1 is placed in position on the wire laying pallet 17, and thereupon, the wire laying pins 23 and 23' are pushed down together with the pin board 22 against the biasing force of the coil springs 25 while end faces of the wire holding bosses 8 and 9 and ends of the wire laying pins 23 and 23' are contacted with each other. Consequently, the wire 14 is released finally from the wire laying pins 23 and 23'.

Prior to such releasing, the wire 14 is pushed and inserted between the wire holding bosses 8 or 9 from between the wire laying pins 23 or 23' by the wire forcing ribs 19 on the wire laying pallet 17. Such inserting operation comes to an end at a point of time when the insulating support body 1 is contacted with a face of the wire laying pallet 17, and the single wire (or several wires) 14 is thus transferred completely to the insulating support body 1 side.

Thus, the wire 14 once laid on the wire laying pallet 17 is transferred in a mirror image symmetrical condition to the insulating support body 1 side as seen from FIG. 2. The wire 14 is thus held along the predetermined route by the large number of wire holding bosses 8 and 9 and is opposed to the slots 5 of the wire receiving terminals 3.

<Urging Step>

The insulating support body 1 to which the wire 14 has been transferred is then transported by the turning over, transferring and feeding robot G (refer to FIG. 3) and placed onto the urging jig plate 52 of the urging unit D and then positioned similarly by the bolt holes 12 and the pins 54.

Referring to FIG. 7, the press arm 55 is moved down so that the insulating support body 1 is pressed against the urging jig plate 52, and consequently, the wire 14 is pushed up by the urging blades 53 and force fitted into the slots 5 of the wire receiving terminals 3 so that the core of the wire 14 and the wire receiving terminals 3 are electrically connected to each other.

In this manner, the wire 14 is connected collectively to the plurality of wire receiving terminals 3 of the insulating support body 1.

<Cutting Step>

After completion of such urging operation, the insulating support body 1 is turned over by the gripping elements 77 on the opposite sides of the turning over, transferring and feeding robot G. The insulating support body 1 is then transported to the cutting unit E and placed onto the support plate 59.

After the support plate 59 is moved to a predetermined position as shown in FIG. 8 by the second X-Y feeding mechanism F2, the cutting blade 61 is moved down by operation of the actuator 62 to cut the wire 14 at a certain portion. Then, such operation is repeated for a plurality of different portions of the wire 14 to cut the wire 14 into a plurality of wire pieces.

Consequently, an electrical interconnection assembly 13 wherein the wire receiving terminals 3 are connected to the plurality of wire pieces 14 so as to form such a predetermined pattern as shown in FIG. 2 is obtained.

While the electrical interconnection assembly 13 is constructed from the insulating support body 1 formed as an upper casing of an electric connection box, the plurality of wire receiving terminals 3 and the wire pieces 14 interconnecting them, it is also possible to use an ordinary insulating plate for the insulating support body 1 or to accommodate a bus bar wiring plate in the casing and use it also as the insulating support body 1.

As apparent from the foregoing description of the electric interconnection assembly 13, since the wire pieces 14 connected to the individual wire receiving terminals 3 are force fitted between the plurality of wire holding bosses 8 or 9 and held and secured at the required locations thereof, there is no possibility that a slack or displacement may take place, and the wiring pattern is maintained as it is. Accordingly, the possibility that the wire 14 may be removed from the slot 5 is low, and the reliability in electric connection is high.

The wiring pattern can be changed arbitrarily by changing an arrangement route of a wire 14 at the wiring step as well as portions of the wire 14 to be cut at the cutting step. To this end, it is only necessary to modify the control program for driving the first and second X-Y moving mechanisms F1 and F2, but any of the number and fitting positions of the wire receiving terminals 3 on the insulating support body 1, the number and positions of the wire holding bosses 8 and 9, the wire laying pins 23 and 23' of the pin board 22 and so forth need not be changed.

Further, since, distinct from a conventional template in which a groove is cut, the wire arrangement route can be selected arbitrarily and there is no restriction in structure for cutting a groove, high density wiring is possible.

It is to be noted that, in each of the units B to E shown in FIG. 3, instead that, for example, the wire laying pallet 17 or the support plate 59 is moved in the X or Y direction by the X-Y moving mechanism F1 or F2, alternatively the rockable wire laying jig 34 or the urging blade 53 may be moved in the X and Y directions, respectively.

Figure 9:
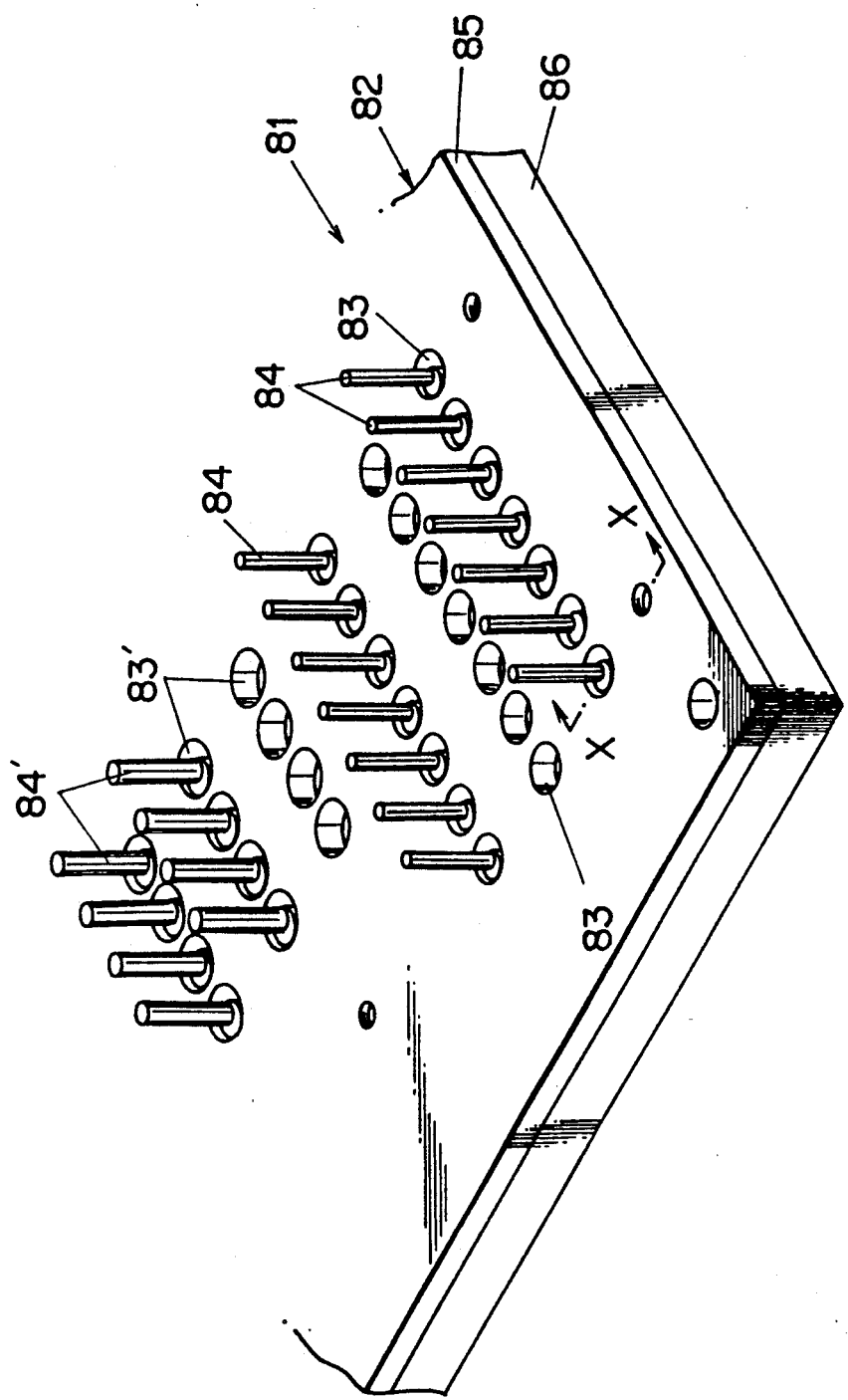
FIG. 9 is a perspective view of an improved wire laying jig which may be used in the apparatus of FIG. 3.

Referring now to FIG. 9, there is shown an improved wire laying element or jig according to the present invention. The wire laying jig generally denoted at 81 is an improvement to and can be used in place of the wire laying pallet 17 and pin board 22 described hereinabove and is characterized in that a plurality of wire laying pins 84 and 84', which correspond to the wire laying pins 23 and 23', respectively, are provided for individual movement in a plurality of round holes 83 and 83' formed in a juxtaposed, equidistantly spaced relationship from each other in a pin board body 82. Though not shown, the wire laying jig 81 includes such wire laying pallet 17 as particularly shown in FIG. 4 and described hereinabove in addition to the pin board body 82.

Figure 10:
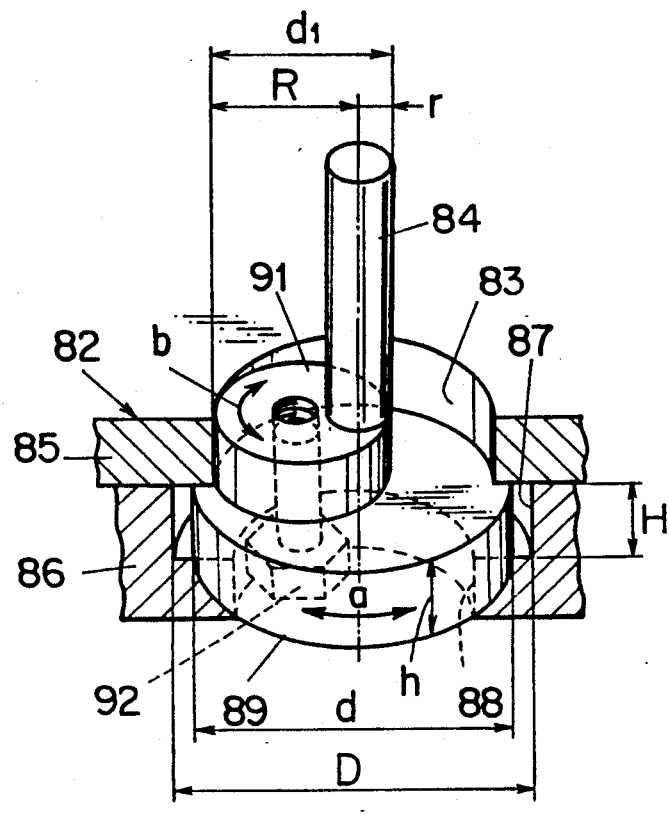
FIG. 10 is a sectional perspective view taken along line X—X of FIG. 9.

Referring to FIGS. 9 and 10, the pin board body 82 includes a rather thin upper plate 85 and a rather thick lower plate 86 overlapped with each other, and the round holes 83 are formed in the upper plate 85 while corresponding circular counter sunk slots 87 having a greater diameter than the round holes 83 and through-holes 88 are formed in the lower plate 86 concentrically to the round holes 83.

A rotatable disk 89 is fitted in each of the counter sunk slots 87. The rotatable disk 89 has a diameter d a little smaller than the diameter D of the slot 87 but has a thickness h a little greater than the depth H of the slot 87, and a small circular rotatable element 91 having an eccentric wire laying pin 84 thereon is secured to an eccentric position of the rotatable disk 89 by means of a bolt 92. The wire laying pin 84 is securely mounted on the top of the rotatable element 91, and the outer diameter d1 of the rotatable element 91 is set greater than the radius R of the round hole 83 by a distance equal to the radius r of the wire laying pin 84 so that the wire laying pin 84 may be positioned at the center of the round hole 83. A female thread 93 for the bolt 92 is formed at the center of the rotatable element 91, and a corresponding fitting hole 94 is formed in the rotatable disk 89.

Figure 11:
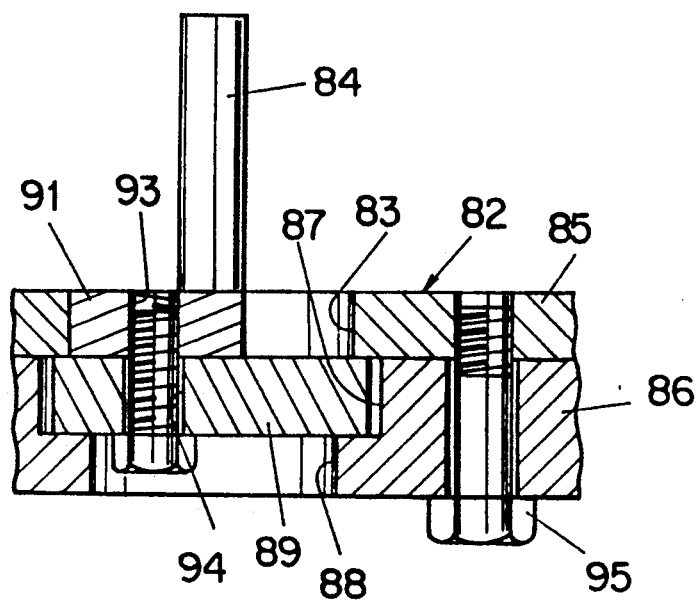
FIG. 11 is a sectional view taken along line X—X of FIG. 9.
Figure 12:
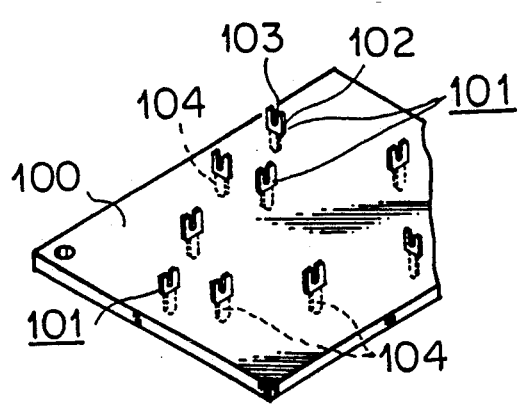
FIG. 12 is a perspective view of a conventional insulating support body for use with an electrical interconnection assembly.
Figure 13:
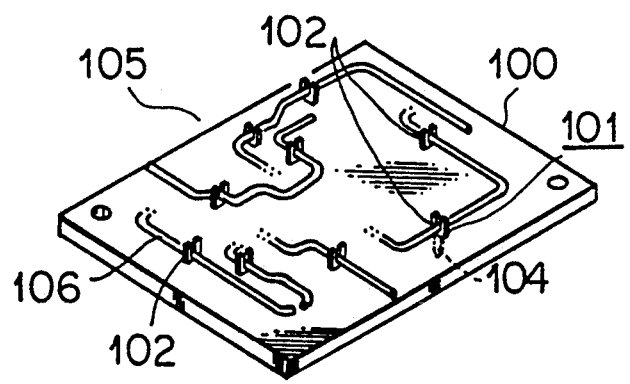
FIG. 13 is a perspective view of a conventional electrical interconnection assembly in which the insulating support body is used.
Figure 14:
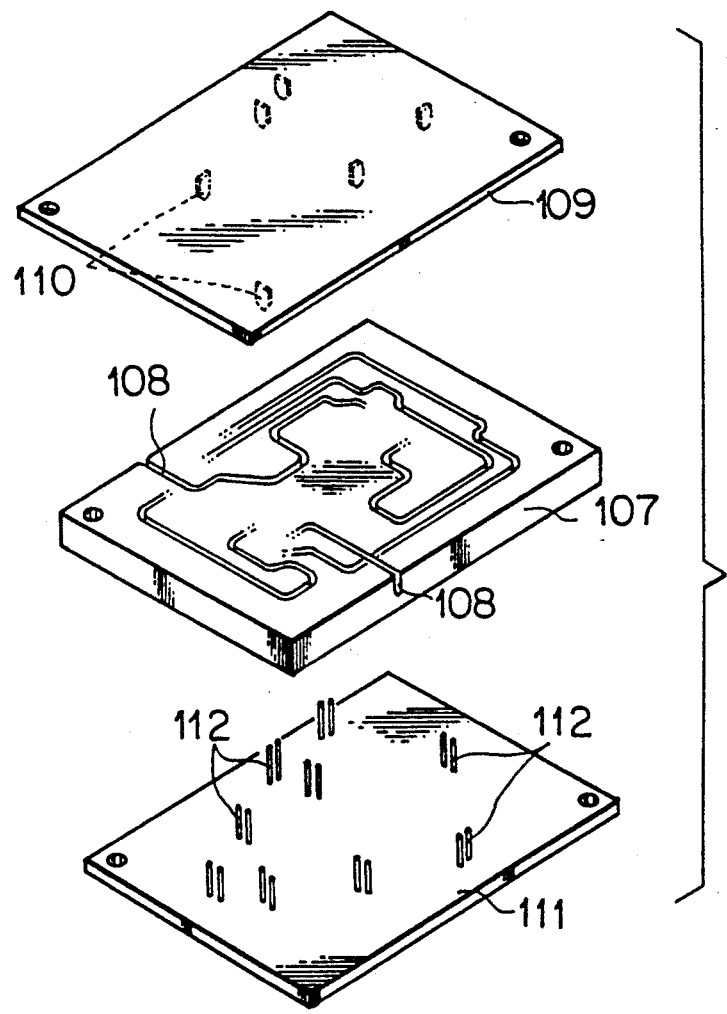
FIG. 14 is a fragmentary perspective view of an apparatus for use for manufacturing the conventional electrical interconnection assembly shown in FIG. 13.

With the wire laying jig 81, the rotatable disks 89 will be rotated around axes thereof as indicated by an arrow mark a in FIG. 10 in accordance with a circuit wiring pattern to be formed (refer to FIG. 2) while the bolts 92 are in a loosened condition, and then the rotatable elements 91 will be rotated around axes of the bolt holes 93 as indicated by another arrow mark b in FIG. 10 to rotate the wire laying pins 84 around the axes of the bolt holes 93 to set them at respective desired positions. Then, the bolts 92 will be tightened to fix the rotatable elements 91 and the rotatable disks 89, and after then, the upper plate 85 and the lower plate 86 of the pin board 82 are tightened by a plurality of fastening bolts 95 (refer to FIG. 11) to clamp and fix the rotatable disks 89 to the upper plate 85 within the counter sunk slot 87.

Thus, it is possible to cope with various circuit patterns using the single wire laying jig 81 by suitably and selectively setting the above described movable wire laying pins 84 and 84' in the respective round holes 83 and 83' formed in a closely and equidistantly spaced relationship from each other in the pin board 82.

Having now fully described the invention, it will be apparent to one of ordinary skill in the art that many changes and modifications can be made thereto without departing from the spirit and scope of the invention as set forth herein.

What is claimed is:

1. A process of manufacturing an electrical interconnection assembly wherein a plurality of wire receiving terminals are mounted on an insulating support body and interconnected in a predetermined wiring pattern by an insulated wire, comprising at least the steps of:

arranging a continuous length of insulated electrical wire onto a wire laying pallet which has a plurality of wire laying pins mounted in a plurality of rows thereon, said plurality of wire laying pin moving to and from a projecting position in which said wire laying pins project from said wire laying pallet, said wire laying pallet further having a plurality of wire forcing ribs along said rows of said wire laying pins; and placing onto said wire laying pins of said wire laying pallet an insulating support body on which a plurality of wire receiving terminals are mounted, each wire receiving terminal having at an end thereof a wire receiving plate portion having a slot formed therein and each wire receiving terminal having a terminal portion at the other end thereof, and said insulating support body has a plurality of wire holding bosses provided thereon to push down said wire laying pins to move from said projecting position therein urging said insulated wire to be released from said wire laying pins and inserted between said wire holding bosses and therein transferring said insulated wire to said insulating support body.

2. A process of manufacturing an electrical interconnection assembly wherein a plurality of wire receiving terminals are mounted on an insulating support body and interconnected in a predetermined wiring pattern by an insulated wire, comprising at least the steps of:

arranging a continuous length of insulated electrical wire onto a wire laying pallet which has a plurality of wire laying pins mounted in a plurality of rows thereon, said plurality of wire laying pins moving to and from a projecting position in which said wire laying pins project from said wire laying pallet, said wire laying pallet further having a plurality of wire forcing ribs along said rows of said wire laying pins;

placing onto said wire laying pins of said wire laying pallet an insulating support body on which a plurality of wire receiving terminals are mounted, each wire receiving terminal having at an end thereof a wire receiving plate portion having a slot formed therein and each wire receiving terminal having a terminal portion at the other end thereof, and said insulating support body has a plurality of wire holding bosses provided thereon to push down said wire laying pins to move from said projecting position therein urging said insulated wire to be released from said wire laying pins and inserted between said wire holding bosses and therein transferring said insulated wire to said insulating support body;

force fitting said insulated wire transferred to said insulating support body into said slots of said wire receiving terminals establishing electric connection between the core of said wire and said terminals; and cutting said wire at predetermined portions into a plurality of pieces forming a predetermined wiring pattern.

3. A process of manufacturing an electrical interconnection assembly as claimed in claim 1 or 2, wherein, at the arranging step, arrangement of said insulated wire is performed, using a rockable wire laying jig which has a wire extracting nozzle at a lower end thereof and is mounted for downward and upward movement toward and away from said wire laying pallet, by moving at least one of said rockable wire laying jig and said wire laying pallet in two horizontal perpendicular directions.

4. An apparatus for manufacturing an electrical interconnection assembly, comprising:

a wire laying unit including a wire laying pallet which has a plurality of pin holes formed therein and has a plurality of wire forcing ribs provided thereon, a mounting base plate on and above which said wire laying pallet is secured in a suitably spaced relationship, a pin board having a plurality of wire laying pins mounted thereon, said plurality of wire laying pins moving to and from a projecting position in which said wire laying pins project from said wire laying pallet into said pin holes of said wire laying pallet, said pin board being mounted for up and down movement between said wire laying pallet and said mounting base plate, coil spring means interposed between said mounting base plate and said pin board for normally biasing said pin board upwardly, a wire laying head having at a lower end portion thereof a rockable wire laying jig including a wire extracting nozzle, said wire laying head being mounted for up and down movement relative to said wire laying pellet, and means for moving one of said mounting base plate and said wire laying head in two horizontal perpendicular directions relative to the other; and a wire transferring unit including means for gripping an insulating support body, on which a plurality of wire receiving terminals are mounted and which has a plurality of wire holding bosses provided thereon, for upward and downward movement in an opposing relationship to said wire laying pallet, said wire transferring unit being operable to place said insulating support body onto said wire laying pins of said wire laying pallet and push down said wire laying pins thereby to urge said insulated wire to be released from said wire laying pins and inserted between said wire holding bosses to transfer said insulated wire to said insulating support body.

5. An apparatus for manufacturing an electrical interconnection assembly, comprising:

a wire laying unit for laying an insulated wire along a predetermined route onto a wire laying jig which as a plurality of wire laying pins mounted thereon, said wire laying pins moving to and from a projecting position in which said wire laying pins project from said wire laying jig, said wire laying jig further having plurality of wire forcing ribs provided thereon;

a wire transferring unit for pushing down said wire laying pins from said projecting position to transfer said insulated wire from said wire laying jig to an insulating support body on which a plurality of wire receiving terminals are mounted, each wire receiving terminal having at an end thereof a wire receiving plate portion having a slot formed therein and each wire receiving terminal having a terminal portion at the other end thereof, and said insulating support body has a plurality of wire holding bosses provided thereon;

an urging unit including means for force fitting said insulated wire thus transferred to said insulating support body into said slots of said wire receiving terminals to establish electric connection between the core of said wire and said terminals; and a wire cutting unit including means for cutting said insulated wire connected to said wire receiving terminals at predetermined portions into a plurality of pieces to form a predetermined wiring pattern.

6. A apparatus for manufacturing an electrical interconnection assembly as claimed in claim 5, wherein said wire laying unit includes a wire laying pallet which has a plurality of pin holes formed therein and has a plurality of wire forcing ribs provided thereon, a mounting base plate on and above which said wire laying pallet is secured in a suitably spaced relationship, a pin board having a plurality of wire laying pins mounted thereon for movement to and from a projecting position in which said wire laying pins project from said wire laying pallet into said pin holes of said wire laying pallet, said pin board being mounted for up and down movement between said wire laying pellet and said mounting base plate, coil spring means interposed between said mounting base plate and said pin board for normally biasing said pin board upwardly, a wire laying head having at a lower end portion thereof a rockable wire laying jig including a wire extracting nozzle, said wire laying head being mounted for up and down movement relative to said wire laying pallet, and means for moving one of said mounting base plate and said wire laying head in two horizontal perpendicular directions relative to the other.

7. An apparatus for manufacturing an electrical interconnection assembly as claimed in claim 5, wherein said wire transferring unit includes means for gripping an insulating support body, on which a plurality of wire receiving terminals are mounted and which has a plurality of wire holding bosses provided thereon, for upward and downward movement in an opposing relationship to said wire laying pallet, said wire transferring unit being operable to place said insulating support body onto said wire laying pins of said wire laying pallet and push down said wire laying pins thereby to urge said insulated wire to be released from said wire laying pins and inserted between said wire holding bosses to transfer said insulated wire to said insulating support body.

* * * * *

UNITED STATES PATENT AND TRADEMARK OFFICE
CERTIFICATE OF CORRECTION

PATENT NO. : 5,289,633
DATED : March 1, 1994
INVENTOR(S) : Osamu Okafuji, et al.

It is certified that error appears in the above-indentified patent and that said Letters Patent is hereby corrected as shown below:

On the title page, item [75]: Inventors, change "Yamaguchi, Akio" to --Akio Yamaguchi--.

Signed and Sealed this

Thirteenth Day of December, 1994

Attest:

BRUCE LEHMAN

Attesting Officer          Commissioner of Patents and Trademarks